US005556712A

United States Patent [19]

Kimura et al.

[11] Patent Number: 5,556,712

[45] Date of Patent: Sep. 17, 1996

[54] BASE FILM FOR PHOTOGRAPHIC FILM

[75] Inventors: Manabu Kimura; Hideshi Kurihara, both of Matsuyama, Japan

[73] Assignee: Teijin Limited, Osaka, Japan

[21] Appl. No.: 423,985

[22] Filed: Apr. 18, 1995

[30] Foreign Application Priority Data

Apr. 19, 1994 [JP] Japan .................................... 6-080365
May 6, 1994 [JP] Japan .................................... 6-094338

[51] Int. Cl.[6] .......................... G03C 1/795; C08G 63/18; B32B 27/06

[52] U.S. Cl. .......................... 428/480; 430/533; 528/305

[58] Field of Search .................................... 430/533, 523, 430/535; 428/480; 528/305

[56] References Cited

U.S. PATENT DOCUMENTS

| | | | |
|---|---|---|---|
| 3,671,578 | 6/1972 | Ogata et al. | 562/488 |
| 5,350,874 | 9/1994 | Behrens et al. | 560/80 |
| 5,457,017 | 10/1995 | Kimura et al. | 430/533 |

FOREIGN PATENT DOCUMENTS

| | | |
|---|---|---|
| 0334367 | 9/1989 | European Pat. Off. . |
| 0496346 | 7/1992 | European Pat. Off. . |
| 0581120 | 2/1994 | European Pat. Off. . |
| 50-28595 | 3/1975 | Japan . |
| 62-61063 | 12/1987 | Japan . |
| 1201324 | 8/1989 | Japan . |
| 1244446 | 9/1989 | Japan . |
| 4120129 | 4/1992 | Japan . |
| 455607 | 9/1992 | Japan . |
| 616797 | 1/1994 | Japan . |
| 643582 | 2/1994 | Japan . |
| 643581 | 2/1994 | Japan . |
| 641281 | 2/1994 | Japan . |
| 682980 | 3/1994 | Japan . |
| 682981 | 3/1994 | Japan . |
| WO92/13021 | 8/1992 | WIPO . |

*Primary Examiner*—Richard L. Schilling
*Attorney, Agent, or Firm*—Sherman and Shalloway

[57] ABSTRACT

A base film for a photographic film, which (A) consists essentially of polyethylene-2,6-naphthalenedicarboxylate containing naphthoic acid unit in an amount, in terms of methyl naphthoate, of 2 to 1,000 ppm, (B) has a light transmittance, $T_{400}$, of at least 95%/cm at a wavelength of 400 nm when a solution of 10 mg/ml of the polyethylene-2,6-naphthalenedicarboxylate in a hexafluoroisopropanol/chloroform mixed solvent having a hexafluoroisopropanol/chloroform weight ratio of ⅔ is measured, (C) has a yellow index $Y_{ID}$ of at most S, and (D) has a haze value of 2.0% or less.

17 Claims, No Drawings

BASE FILM FOR PHOTOGRAPHIC FILM

DETAILED DESCRIPTION OF THE INVENTION

The present invention relates to a base film for a photographic film. More specifically, it relates to a base film for a photographic film, excellent in transparency, hue and the property of being easily relieved of a curling.

A biaxially oriented polyethylene-2,6-naphthalenedicarboxylate film has excellent mechanical, thermal and electrical properties, and has been and is studied for use in a variety of fields. Further, it is practically used in the fields of a magnetic recording medium and electric insulation.

For example, a film is used in the field of a photosensitive material, and this field is largely classified into a field where it is used in the form of a sheet such as an X-ray film, a printing film or a cut film and a field where it is used as a roll film. The typical example of the roll film is a color or black and white negative film which is 35 mm wide or less and used in a film cartridge to be encased in a general camera for taking photos.

A biaxially oriented polyester film formed of a polyethylene terephthalate is mainly used as a base film for a film in the form of a sheet, and a film of a cellulose polymer typified by triacetyl cellulose (to be sometimes abbreviated as "TAC" hereinafter) is mainly used as a base for a roll film.

A TAC film has characteristic features in that it is free of optical anisotropy, that it is with high transparency and that it is excellent in the property of freedom from curling after treated for development. It is generally said that the excellent freedom of a TAC film from curling is the feature which does not belong to a film of any other material. Since, however, an organic solvent is used in the step of producing a TAC film, it is required to recover the solvent completely for the prevention of environmental pollution. In particular, environmental destruction is one of the issues which attract attention, and there is an intense tendency to avoid the use of an organic solvent which may cause environmental destruction.

On the other hand, a polyethylene terephthalate film is that which can be formed by a melt extrusion method using no organic solvent, and it is used as a base film for a photosensitive material in part of the field of photosensitive materials.

However, a polyethylene terephthalate film involves problems in that it undergoes curling (curling tendency) and that it is difficult to remove the curling.

Japanese Laid-open Patent Publication No. 1-244446 (244,446/1989) discloses a photosensitive material formed of a polyester base film having a haze of 3% or less and a water content of at least 0.5% by weight and having at least one photosensitive layer. The feature of this photosensitive material is that the base film has a water content of at least 0.5% by weight, and for accomplishing this water content, an aromatic dicarboxylic acid component having metal sulfonate is copolymerized.

The above photosensitive material is improved in the reduction of the curling tendency. However, it is insufficient in other properties, since it has defects in that the dimensional stability decreases due to the moisture absorption and that the deformation of film side portions increases due to a decrease in glass transition temperature.

In recent years, the use of a photosensitive material has been diversified, and the rate of feeding a film at the time of taking photographs is increasing, and the size of a camera is decreasing. Thus, a photosensitive material is required to have performances such as strength, dimensional stability and suitability to forming a thin film as well as the freedom from curling tendency. These requirements can be satisfied by none of a triacetate film and a modified polyethylene terephthalate film, and it is desired to develop a film for a photosensitive material.

Meanwhile, it is known that polyethylene-2,6-naphthalenedicarboxylate is a raw material excellent in strength, dimensional stability and the suitability to forming a thin film. However, a film of polyethylene-2,6-naphthalenedicarboxylate is not necessarily sufficient in transparency and hue as a base film for a photographic film. Moreover, it has a defect in that a fold is whitened.

Japanese Laid-open Patent Publication No. 50-28595 (28,595/1975) discloses a process for the production of a polyester, which comprises esterifying and ester-interchanging an acid component containing naphthalenedicarboxylic acid and/or an ester-forming derivative thereof and a diol component containing 1,4-cyclohexanedimethanol and/or an ester-forming derivative thereof, and polycondensing the resultant bisdiol ester of naphthalendicarboxylic acid and/or a low polymer thereof.

The above Publication also discloses that the performances of the so-obtained polyester are that it has a high secondary transition point, that it is excellent in dimensional stability, transparency and heat resistance and that it can be hence used as a raw material for a film.

Japanese Laid-open Patent Publication No. 1-201324 (201,324/1989) discloses a highly transparent copolyester for an optical device, which is formed from naphthalenedicarboxylic acid as an acid component and a mixture of 50 to 82 mol % of 1,4-cyclohexanedimethanol and 50 to 18 mol % of ethylene glycol as a glycol component and has a refractive index, n, of at least 1.6 and an Abbe's number, ν, of at least 30.

The polyesters disclosed in the above two Laid-open Publications have a feature in that their glycol component is 1,4-cyclohexanedimethanol.

EP 0581120A1 discloses a polyester base film for a silver halide photographic material, having a glass transition point of from 90° C. to 200° C. and having been heat-treated at a temperature of from 50° C. to its glass transition point.

It is an object of the present invention to provide a base film for a photographic film.

It is another object of the present invention to provide a base film for a photographic film, which has excellent transparency and hue, particularly has a low tinge of yellow.

It is further another object of the present invention to provide a base film for a photographic film, which is excellent in the property of being easily relieved of a curling.

It is further another object of the present invention to provide a base film for a photographic film, whose fold is not whitened or hardly whitened.

Other objects and advantages of the present invention will be apparent from the following description.

According to the present invention, the above objects and advantages of the present invention are achieved by a base film for a photographic film, which (A) consists essentially of polyethylene-2,6-naphthalenedicarboxylate containing naphthoic acid unit in an amount, in terms of methyl naphthoate, of 2 to 1,000 ppm, (B) has a light transmittance, $T_{400}$, of at least 95%/cm at a wavelength of 400 nm when a solution of 10 mg/ml of the polyethylene-2,6-naphthalenedicarboxylate in a hexafluoroisopropanol/chloroform mixed solvent having a hexafluoroisopropanol/chloroform weight ratio of ⅔ is measured, (C) has a yellow index $Y_{ID}$ of at most 5, and (D) has a haze value of 2.0% or less.

The raw material for the base film for a photographic film, provided by the present invention, is a polyethylene-2,6-naphthalenedicarboxylate in which 2,6-naphthalenedicarboxylic acid is a main acid component and ethylene glycol is a main glycol component. Examples of a secondary acid component include aromatic dicarboxylic acids such as 2,7-naphthalenedicarboxylic acid, 1,5-naphthalenedicarboxylic acid, terephthalic acid, isophthalic acid, diphenylethanedicarboxylic acid, diphenyldicarboxylic acid, diphenyl ether dicarboxylic acid, diphenylsulfonedicarboxylic acid, diphenyl ketone dicarboxylic acid and anthracenedicarboxylic acid; aliphatic dicarboxylic acids such as sebacic acid and adipic acid; and alicyclic dicarboxylic acids such as cyclohexane-1,4-dicarboxylic acid.

In the polyethylene-2,6-naphthalenedicarboxylate, the amount of 2,6-naphthalenedicarboxylic acid as a main acid component is preferably 90 to 100 mol %. That is, the amount of a secondary acid component is preferably less than 10 mol %.

For the above polyethylene-2,6-naphthalenedicarboxylate used in the present invention, ethylene glycol is used as a main glycol component. Examples of a secondary glycol component include alicyclic diols such as 1,4-cyclohexanedimethanol; polymethylene glycols having 3 to 10 carbon atoms such as trimethylene glycol, tetramethylene glycol, pentamethylene glycol, hexamethylene glycol and decamethylene glycol; aromatic diols such as hydroquinone, resorcin and 2,2-bis(4-hydroxyphenyl)propane; and polyoxyalkylene glycols having a molecular weight of 600 to 5,000, such as polyethylene glycol, polypropylene glycol and polytetramethylene glycol.

In the above polyethylene-2,6-naphthalenedicarboxylate used in the present invention, the amount of ethylene glycol as a main glycol component is preferably 80 to 100 mol %. That is, the amount of a secondary glycol component is preferably less than 20 mol %.

Further, the polyethylene-2,6-naphthalenedicarboxylate contains naphthoic acid unit in an amount, as methyl naphthoate, of 2 to 1,000 ppm.

When the content of the naphthoic acid unit is smaller than 2 ppm, the base film is poor in whitening in a fold. The reason therefor is presumably as follows. For example, when the amount of naphthoic acid bonding to the polyester terminal is small, the polyester molecule is brought into an excessively oriented state when the film is biaxially oriented, and when the film is deformed by folding, the polyester molecule undergoes abrasive deformation to excess so that the film is liable to break in a laminar form. Or, when the amount of free naphthoic acid and/or a lower alkyl ester of free naphthoic acid are/is too small, the plasticizer effect of the free naphthoic acid and/or the lower alkyl ester of free naphthoic acid on the polyester molecule decreases, and the polyester molecule undergoes abrasive deformation so that the film is liable to break in a laminar form.

On the other hand, when the content of the naphthoic acid unit exceeds 1,000 ppm, the photographic film is poor in the property of being easily relieved of a curling. The reason therefor is presumably as follows. For example, when the amount of naphthoic acid bonding to the polyester terminal is large, the polyester molecule is brought into an insufficiently oriented state when the film is biaxially oriented, and the film has a low rigidity. Or, when the amount of free naphthoic acid and/or a lower alkyl ester of free naphthoic acid is too large, the plasticizer effect on the polyester molecule increases, and when the film is taken up in the form of a roll during the film production or when the photographic film is used in the form of a roll, the polyester molecule is liable to come stable in the form of a roll so that an intense curling (curling tendency) is retained.

The content of the naphthoic acid unit, as methyl naphthoate, is preferably 3 to 800 ppm, more preferably 5 to 500 ppm.

The term "naphthoic acid unit" in the present invention is used in a sense including all of free naphthoic acid and free naphthoic acid alkyl ester contained in the polyester and a naphthoic acid unit bonding to the polymer chain terminal. Above all, the naphthoic acid unit desirably bonds to the polymer chain terminal.

For producing the above polyethylene-2,6-naphthalenedicarboxylate having a naphthoic acid unit content of 2 to 1,000 ppm, it is preferred to use naphthalenedicarboxylic acid and/or its lower alkyl ester containing naphthoic acid and/or a lower alkyl ester of naphthoic acid in an amount of 10 to 5,000 ppm, preferably 20 to 3,000 ppm, more preferably 30 to 2,000 ppm when the polyethylene-2,6-naphthalenedicarboxylate is produced. When the content of the above naphthoic acid and/or a lower alkyl ester of naphthoic acid is smaller than 10 ppm, the content of the naphthoic acid unit in the polyethylene-2,6-naphthalenedicarboxylate is smaller than 2 ppm. When the content of the above naphthoic acid and/or a lower alkyl ester of naphthoic acid is larger than 5,000 ppm, undesirably, the polycondensation reaction or ester-interchange reaction proceeds at a decreased rate, and the polyethylene-2,6-naphthalenedicarboxylate has a poor hue. At the same time, the content of the naphthoic acid unit in the polyethylene-2,6-naphthalenedicarboxylate exceeds 1,000 ppm, which is undesirable.

The method of incorporating 10 to 5,000 ppm of the naphthoic acid and/or its lower alkyl ester into the naphthalenedicarboxylic acid and/or its lower alkyl ester is not specially limited, while the incorporation can be carried out, for example, by a method in which a predetermined amount of naphthoic acid and/or a lower alkyl ester of naphthoic acid are/is added to naphthalenedicarboxylic acid and/or its lower alkyl ester or by a method in which the raw materials for polymerization is mixed with a predetermined amount of methyl ester of naphthalenedicarboxylic acid containing by-produced methyl naphthoate recovered in the step of recovering naphthalenedicarboxylic acid from polyethylene-2,6-naphthalenedicarboxylate that cannot be used as a product.

For the polyethylene-2,6-naphthalenedicarboxylate, a component derived from an oxycarboxylic acid other than an oxynaphthoic acid may be copolymerized or bonded in an amount of 20 mol % or less based on the total amount of the acid components so long as the effects of the present invention are not impaired. The oxycarboxylic acid includes an aromatic oxy acid such as hydroxybenzoic acid and aliphatic oxy acid such as ω-hydroxycaproic acid.

Further, for the polyethylene-2,6-naphthalenedicarboxylate used in the present invention, a trifunctional or higher polycarboxylic acid or polyhydroxy compound such as trimellitic acid or pentaerythritol may be copolymerized so long as the polyethylene-2,6-naphthalenedicarboxylate is linear and so long as the effects of the present invention are not impaired, for example, in an amount of 2 mol % or less based on the total amount of the acid components.

The polyethylene-2,6-naphthalenedicarboxylate used in the present invention particularly advantageously contains an ethylene-2,6-naphthalenedicarboxylate unit in an amount of more than 60 mol % based on the total recurring unit amount.

The above polyester used in the present invention may contain inert fine particles as a lubricant.

The inert fine particles can be incorporated, for example, by a method in which inert fine particles such as $SiO_2$, $BaSO_4$, $CaCO_3$, aluminosilicate or crosslinked organic particles are externally added, or by a method in which inert fine particle are internally formed by precipitating a catalyst during the production of the polyethylene-2,6-naphthalenedicarboxylate. In order to secure the transparency of the film, the particles which are to be externally added preferably have a refractive index close to that of the polyethylene-2,6-naphthalenedicarboxylate. For example, $BaSO_4$, aluminosilicate and crosslinked organic particles (crosslinked polystyrene) are preferred.

For advantageously maintaining the transparency of the film, preferred is a method in which a thin film containing inert fine particles is laminated on at least one surface of a film of the polyethylene-2,6-naphthalenedicarboxylate which substantially does not contain particles. For this purpose, it is effective to employ a co-extrusion method using a plurality of extruder and a feed block or a multi-manifold die.

The polyethylene-2,6-naphthalenedicarboxylate used in the present invention can be produced by a conventional polyester production method. For example, an acid and a glycol are directly subjected to an esterification reaction, or when dialkyl ester is used as an acid component, the alkyl ester and glycol are subjected to an ester-interchange reaction and then heat-polymerized under reduced pressure to remove an excess of the glycol component, whereby the polymer can be obtained.

The polyethylene-2,6-naphthalenedicarboxylate used in the present invention is preferably produced in the presence of a manganese compound and an antimony compound as a catalyst and in particular, advantageously contains a manganese element derived from the manganese compound and an antimony element derived from the antimony compound in the following amounts.

$10 \text{ ppm} < Mn < 100 \text{ ppm}$ $130 \text{ ppm} < Sb < 500 \text{ ppm}$ The acetaldehyde content of the above polyethylene-2,6-naphthalenedicarboxylate is preferably at most 60 ppm, more preferably at most 50 ppm, particularly preferably at most 40 ppm. When the acetaldehyde content exceeds 60 ppm, not only the film has a poor hue, but also a photosensitive material coated on the film is modified so that a photographic film giving a biased color tone is undesirably obtained.

In the industrially advantageous production of a polyester film having an acetaldehyde content of at most 60 ppm, the production can be carried out (1) by a method in which a polyethylene-2,6-naphthalenedicarboxylate is produced by melt polymerization while controlling the generation of acetaldehyde by adding 2 to 20 mmol % of an alkali metal salt and 1 to 50 mmol of quaternary ammonium salt to naphthalenedicarboxylic acid and/or its lower alkyl ester and the resultant polyethylene-2,6-naphthalenedicarboxylate is used for the production of the film, (2) by a method in which a polyethylene-2,6-naphthalenedicarboxylate produced by melt polymerization is polymerized in a solid phase under reduced pressure or under the current of nitrogen gas at a temperature range of from 190° C. to a temperature lower than the melting point by 10° C. and the resultant polyethylene-2,6-naphthalenedicarboxylate having a small acetaldehyde content is used for the production of the film, or (3) by a method in which a biaxially oriented polyethylene-2,6-naphthalenedicarboxylate film is further heat set at a temperature between (Tg+60)° C. and (Tg+120)° C. (Tg: glass transition temperature of polyethylene-2,6-naphthalenedicarboxylate) under such conditions that the film has a crystallinity of 30 to 50%, under the current of nitrogen gas.

The polyethylene-2,6-naphthalenedicarboxylate has an intrinsic viscosity of preferably 0.4 to 0.9 dl/g, more preferably 0.5 to 0.8 dl/g.

The transparency of the base film for a photographic film, provided by the present invention, is defined by both the light transmittance of a solution prepared by dissolving the film in a solvent and the haze value of the film per se. That is, a solution prepared by dissolving 10 mg/ml of the above polyethylene-2,6-naphthalenedicarboxylate in a hexafluoroisopropanol/chloroform mixed solvent having a hexafluoroisopropanol/chloroform weight ratio of ⅔ shows a light transmittance, $T_{400}$, of at least 95%/cm at a wavelength of 400 nm. The above light transmittance, $T_{400}$ is preferably at least 97%/cm.

The value of $T_{400}$ is greatly influenced by the comonomers for the polyethylene-2,6-naphthalenedicarboxylate, precipitated particles in the film, added lubricant particles, a catalyst residue, a crystallized product and foreign substances and further by heat deterioration during the film formation. When $T_{400}$ is less than 95%/cm, undesirably, the photosensitivity of the film to light having a short wavelength is defective when the film is used as a base film for a photographic film, and the color tone is biased when the film is used as a base film for a color photographic film.

In the base film of the present invention, the difference between its light transmittance $T_{400}$ at a wavelength of 400 nm and its light transmittance $T_{420}$ at a wavelength of 420 nm ($\Delta T = T_{420} - T_{400}$) is preferably 3%/cm or less.

The transparency of the base film of the present invention is further defined by a haze value which is 2.0% or less. The haze value of the base film is preferably 1.5% or less.

The base film of the present invention has another feature in that it has a very low tinge of yellow. The tinge of yellow can be shown on the basis of a yellow index $Y_{ID}$. The base film of the present invention has a $Y_{ID}$ value of at most 5, preferably at most 4.

The base film of the present invention has a crystallinity of preferably 30 to 50%, more preferably 35 to 45%.

The degree of whitening of a fold can be shown on the basis of an index called a fold whitening ratio. The fold whitening ratio of the base film of the present invention is preferably 10% or less, more preferably 8% or less.

Due to the advantage of the base film of the present invention that it has a small fold whitening ratio, for example, the whitening of portions around holes formed by perforation and the growth of damage caused by a contact to a metal can be avoided.

The base film for a photographic film, provided by the present invention, has an anti-curling ratio of preferably at least 70%, more preferably at least 80%.

The polyester film of the present invention can be produced according to a known method. For example, the polyethylene-2,6-naphthalenedicarboxylate is melted, extruded in the form of a sheet, cooled on a cooling drum to a prepare an unstretched film, then the unstretched film is biaxially oriented and heat set, and optionally, the resultant film is heat-relaxed. In this case, the film properties, such as the surface properties, density and heat shrinkage percentage of the film vary depending upon stretching conditions and other production conditions, and these conditions can be properly selected as required.

For example, in the above production method, the polyethylene-2,6-naphthalenedicarboxylate is melted at a temperature between Tm+10° C. and Tm+30° C. (TM=melting point of polyethylene-2,6-naphthalenedicarboxylate) and extruded to prepare an unstretched film, the unstretched film is monoaxially stretched (in longitudinal or transverse direction) at a temperature between Tg−10° C. and Tg+50° C. (Tg=glass transition temperature of polyethylene-2,6-naphthalenedicarboxylate) at a stretch ratio of 2 to 5, and then the monoaxially stretched film is stretched at right angles with the above stretching direction (e.g., in the longitudinal direction at a second stretching stage when the stretching has been done in the transverse direction at a first stretching stage) at a temperature between Tg and Tg+50° C. at a stretch ratio of 2 to 5. Then, the biaxially stretched film is preferably heat-set at a temperature between a temperature higher than Tg of the polyethylene-2,6-naphthalenedicarboxylate by 60° C. and a temperature higher than the Tg by 120° C. When the heat-set temperature is lower than Tg+60° C., undesirably, the film is defective with regard to the fold whitening ratio. Further, when the heat-set temperature is higher than Tg+120° C., undesirably, the polyethylene-2,6-naphthalenedicarboxylate is crystallized to excess and the film is whitened, so that the film is poor in transparency. The so-obtained film may be further heat-treated at a temperature between a temperature higher than Tg of the polyethylene-2,6-naphthalenedicarboxylate by 60° C. and a temperature Higher than the Tg by 120° C. for improving it in the property of being easily relieved of a curling.

The thickness of the above biaxially oriented film can be properly selected depending upon the use as a photographic film, while it is preferably 40 to 120 μm.

The base film of the present invention has excellent transparency and hue, and therefore can be advantageously used as a base film for a photographic film.

The present invention will be explained more in detail with reference to Examples, but it should be noted that the invention is not limited by these Examples without departing from the scope of the invention. In Examples, "part" stands for "part by weight". Values of various properties described in Examples were measured as follows.

(1) Transmittances of light having a wavelength of 400 nm and light having a wavelength of 420 nm ($T_{400}$, $T_{420}$)

0.25 Gram of a film was dissolved in a hexafluoroisopropanol/chloroform mixed solvent (weight ratio=2/3) to prepare a 25 ml solution (10 mg/ml), and the solution was measured with a self-recording spectrophotometer UV-3101 PC (supplied by Shimadzu Corporation) for a transmittance of light having a wavelength of 400 nm and a transmittance of light having a wavelength of 420 nm ($T_{400}$ and $T_{420}$, unit=%/cm).

(2) Yellow index $Y_{ID}$ of film $Y_{ID}$ of a film was determined using a differential colorimeter SZ-290 supplied by Nippon Denshoku Kogyo K.K. and on the basis of the following equation.

$$Y_{ID} = \frac{100}{Y} \times (1.28X - 1.06Z)$$

wherein X, Y and Z are tristimulus values determined by the International Commission on Illumination and defined in ASTM, vol.8.02 D1925–70.

(3) Film haze (fogging degree)

A film was measured for a haze with an integrating sphere method HTR meter according to JIS-K6714.

Evaluation:

A=Haze of less than 2%, excellent transparency

B=Haze of 2–5%

C=Haze of more than 5%, poor transparency (4) Fold whitening ratio

A film sample having a size of 80 mm×80 mm was prepared, manually folded into two, placed between flat metal plates and pressed with a press machine under a predetermined pressure $P_1$ (kg/cm$^2$G) for 20 seconds. After pressed, the two-folded film was manually restored to its original state, placed between the above metal plates and pressed under the pressure $P_1$ (kg/cm$^2$G) for 20 seconds. The film sample was taken out, and measured for a total length (mm) of whitened portions.

Six fresh film samples were treated in the same manner as above except that the pressure $P_1$ was set at 1, 2, 3, 4, 5 and 6 kg/cm$^2$G.

The fold whitening ratio was defined as a ratio of an average of the total length of whitened portions caused each pressure to the total length of the fold (80 mm), and this value was taken as an index for the likelihood of a fold causing whitening.

Fold whitening ratio=total length of whitened portions (mm)/(80 mm×6) ×100

(5) Glass transition temperature

A polymer was measured with a differential thermal calorimeter (DSC2100-model, supplied by du Pont) for a glass transition peak temperature at a temperature elevation rate of 20° C./minute.

(6) Acetaldehyde (AA) content

A polyethylene-2,6-naphthalenedicarboxylate film was finely milled in liquid nitrogen, the resultant powder was sealed in a glass insert of a high-sensitivity gas chromatograph, and acetaldehyde collected at 170° C. for 10 minutes was quantitatively determined.

(7) Crystallinity

A polyester film was measured for a density with a density gradient tube, and the crystallinity (%) was determined on the basis of the following equation.

$$\text{Crystallinity [\%]} = \frac{\rho c(\rho - \rho a)}{\rho(\rho c - \rho a)} \times 100$$

wherein

ρ=density of polyester film sample

ρa=1.325 (completely amorphous density of polyethylene naphthalate)

ρc=1.407 (completely crystalline density of polyethylene naphthalate)

Unit=g/cm$^3$ for all of the above density values.

(8) Anti-curling ratio (property of being relieved of curling)

A film sample having a size of 120 mm×25 mm was placed in a flat state in an atmosphere at 23° C. 50 % RH for 24 hours, then wound about a winding core having a diameter of 7 mm in the film-longitudinal direction and temporarily fixed so that the film sample was not unwounded. The wound film sample was heat-treated at 80° C. for 2 hours, and the released from the winding core. Then, the film sample was immersed in distilled water at 40° C. for 15 minutes, then suspended perpendicularly in the film-longitudinal direction, and dried in a constant-temperature chamber with air at 55° C. for 3 minutes while the sample film was suspended with a weight of 33.5 g. Then, the weight was removed, and a distance (A:mm) between the top end of the film and the lower end of the film was measured. The anti-curling ratio (%) was expressed by the following equation, and used as an index for the property of being relieved of curling.

$$\text{Anti-curling ratio [\%]} = \frac{A}{120} \times 100$$

EXAMPLE 1

100 Parts of 2,6-naphthalenedicarboxylic acid methyl ester and 60 parts of ethylene glycol were allowed to react in an ester-interchange reaction in the presence of 0.03 part (1.23 mol) of manganese acetate tetrahydrate as an ester-interchange catalyst according to a conventional method, and then the ester-interchange reaction was substantially terminated by adding 0.023 part (1.64 mol) of trimethyl phosphate. At this point of time, 2 mmol %, based on an acid component, of hydroxytetraethylammonium was added.

Further, 0.024 part (0.82 mol) of antimony trioxide was added, and then the mixture was subjected to a polycondensation reaction at a high temperature in vacuum according to a conventional method to give a polyethylene-2,6-naphthalenedicarboxylate having an intrinsic viscosity (measured in a phenol/tetrachloroethane mixed solvent at 35° C.) of 0.62 dl/g.

Pellets of the above polyethylene-2,6-naphthalenedicarboxylate was dried at 180° C. for 5 hours, fed through the hopper of an extruder and melted at a melting temperature of 300° C., and the molten polymer was extruded through a 1-mm-slit-shaped die onto a rotary cooling drum having a surface temperature of 40° C. to give an unstretched film. The so-obtained unstretched film was preheated at 120° C., stretched 3.0 times between high-speed and low-speed rolls with heating from 15 mm above with an IR heater having a surface temperature of 900° C., fed to a stenter and stretched 3.3 times in the transverse direction at 140° C. The resultant biaxially oriented film was heat-set under a nitrogen current at 215° C. for 10 seconds to give a polyethylene-2,6-naphthalenedicarboxylate having a thickness of 75 μm. This film had an intrinsic viscosity of 0.60 dl/g.

The above-obtained film was heat-treated at 115° C. for 2 days and measured for properties as shown in Table 1 to show excellent results as shown in Table 1.

EXAMPLES 2–9 AND COMPARATIVE EXAMPLES 1–3

Biaxially films were obtained in the same manner as in Example 1 except that the base polymer properties were changed as shown in Table 1.

TABLE 1

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Base polymer properties | | | | | | | | | |
| Content of naphthoic acid unit (ppm) | 10 | 120 | 500 | 600 | 120 | 120 | 120 | 120 | 120 |
| Acetaldehyde content (ppm) | 22 | 21 | 23 | 20 | 45 | 11 | 39 | 30 | 21 |
| Content of Mn (ppm) | 68 | 68 | 68 | 22 | 68 | 68 | 22 | 68 | 68 |
| Content of Sb (ppm) | 240 | 240 | 240 | 240 | 240 | 240 | 240 | 360 | 240 |
| Film properties | | | | | | | | | |
| $Y_{ID}$ | 3.2 | 3.3 | 3.5 | 3.0 | 2.9 | 4.0 | 2.8 | 3.5 | 3.9 |
| Haze (%) | 0.7 | 0.9 | 1.3 | 0.8 | 0.5 | 1.5 | 0.4 | 1.1 | 1.3 |
| $T_{400}$ (%) | 97.8 | 97.6 | 97.3 | 97.7 | 98.2 | 97.0 | 98.7 | 97.0 | 97.0 |
| ΔT (%) | 1.3 | 1.3 | 1.3 | 1.4 | 1.2 | 1.4 | 0.9 | 1.4 | 1.3 |
| Anti-curling ratio (%) | 92 | 90 | 80 | 90 | 88 | 91 | 88 | 90 | 91 |
| Crystallinity (%) | 39 | 39 | 39 | 40 | 36 | 43 | 35 | 39 | 39 |
| Fold whitening ratio (%) | 8 | 5 | 2 | 2 | 7 | 4 | 7 | 5 | 8 |
| Film thickness (μm) | 75 | 75 | 75 | 75 | 75 | 75 | 75 | 75 | 100 |

| | Comp. Ex. 1 | Comp. Ex. 2 | Comp. Ex. 3 |
|---|---|---|---|
| Base polymer properties | | | |
| Content of naphthoic acid unit (ppm) | 1200 | 1 | 0 |
| Acetaldehyde content (ppm) | 22 | 22 | 22 |
| Content of Mn (ppm) | 68 | 68 | 68 |
| Content of Sb (ppm) | 240 | 240 | 240 |
| Film properties | | | |
| $Y_{ID}$ | 5.1 | 3.1 | 3.1 |
| Haze (%) | 2.1 | 0.7 | 0.4 |
| $T_{400}$ (%) | 94.2 | 97.8 | 97.9 |
| ΔT (%) | 1.8 | 1.2 | 1.1 |
| Anti-curling ratio (%) | 40 | 95 | 95 |
| Crystallinity (%) | 39 | 39 | 39 |
| Fold whitening ratio (%) | 0 | 20 | 60 |
| Film thickness (μm) | 75 | 75 | 75 |

Ex. = Example
Comp. Ex. = Comparative Example

What is claimed is:

1. A base film for a photographic film, which (A) consists essentially of polyethylene-2,6-naphthalenedicarboxylate containing naphthoic acid unit in an amount, in terms of methyl naphthoate, of 2 to 1,000 ppm, (B) has a light transmittance, $T_{400}$, of at least 95%/cm at a wavelength of 400 nm when a solution of 10 mg/ml of the polyethylene-2,6-naphthalenedicarboxylate in a hexafluoroisopropanol/chloroform mixed solvent having a hexafluoroisopropanol/chloroform weight ratio of ⅔ is measured, (C) has a yellow index $Y_{ID}$ of at most 5, and (D) has a haze value of 2.0% or less.

2. The base film of claim 1, wherein the polyethylene-2,6-naphthalenedicarboxylate contains the naphthoic acid unit in an amount, as methyl naphthoate, of 3 to 800 ppm.

3. The base film of claim 2, wherein the polyethylene-2,6-naphthalenedicarboxylate contains the naphthoic acid unit in an amount, as methyl naphthoate, of 5 to 500 ppm.

4. The base film of claim 1, wherein the naphthoic acid unit contained in the polyethylene-2,6-naphthalenedicarboxylate bonds to a polymer chain terminal of the polyethylene-2,6-naphthalenedicarboxylate.

5. The base film of claim 1, wherein $T_{400}$ is at least 96%/cm.

6. The base film of claim 1, wherein $T_{400}$ is at least 97%/cm.

7. The base film of claim 1, wherein $Y_{ID}$ is at most 4.

8. The base film of claim 1, wherein the haze value is 1.5% or less.

9. The base film of claim 1, wherein the film has an anti-curling ratio of at least 70%.

10. The base film of claim 1, wherein the film has an anti-curling ratio of at least 80%.

11. The base film of claim 1, wherein the polyethylene-2,6-naphthalenedicarboxylate contains at most 60 ppm of acetaldehyde.

12. The base film of claim 1, wherein the film has a crystallinity of 30 to 50%.

13. The base film of claim 1, wherein the polyethylene-2,6-naphthalenedicarboxylate contains a manganese element and an antimony element in amounts of $$10\ ppm < Mn < 100\ ppm$$

$$130\ ppm < Sb < 500\ ppm.$$

14. The base film of claim 1, wherein the polyethylene-2,6-naphthalenedicarboxylate has an intrinsic viscosity of 0.4 to 0.9 dl/g.

15. The base film of claim 1, wherein a value obtained by deducting a light transmittance $T_{400}$ at a wavelength of 400 nm from a light transmittance $T_{420}$ at a wavelength of 420 nm is 3%/cm or less.

16. The base film of claim 1, wherein the film has a fold whitening ratio of 10% or less.

17. The base film of claim 1, wherein the film has a thickness of 40 to 120 μm.

* * * * *